June 19, 1934.  G. B. WATKINS  1,963,602
SAFETY GLASS
Filed June 25, 1931
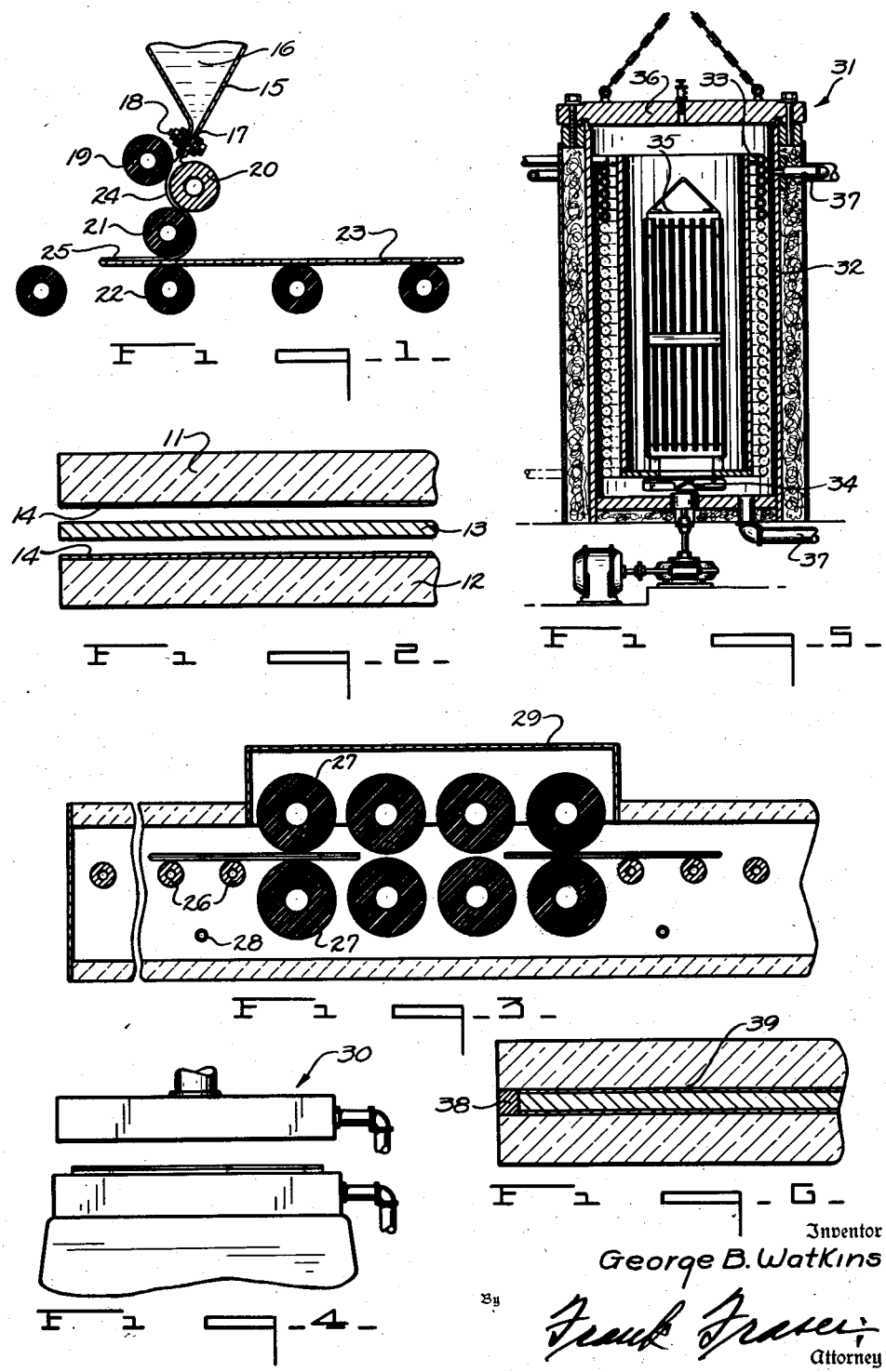
Inventor
George B. Watkins
By Frank Fraser
Attorney Patented June 19, 1934

1,963,602

UNITED STATES PATENT OFFICE 1,963,602

SAFETY GLASS

George B. Watkins, Toledo, Ohio, assignor to Libbey-Owens-Ford Glass Company, Toledo, Ohio, a corporation of Ohio Application June 25, 1931, Serial No. 546,751

9 Claims. (Cl. 49—81)

The present invention relates to the art of safety glass manufacture and more particularly to an improved bonding medium. The expression "safety glass" is used to designate a composite structure usually consisting of two or more sheets of glass with one or more interposed non-brittle layers, for example, pyroxylin plastic sheets. The value of such a composite structure is dependent, among other things, upon the adequacy and permanency of the bond between the laminations, clearness of vision including freedom from dirt, and stability of the sheet.

It is an object of the present invention to provide a process for producing an improved safety glass wherein the bond inducing medium or bonding agent can be applied easily and by mechanical means if desired. The invention also contemplates the use of a bonding agent including a mixture of a water soluble adhesive, for example, gelatin and a solvent therefor, for example, diethylene glycol, which mixture or solution, after it has been properly reacted, has added thereto a diluent, preferably water. The mixture, after it has been applied to the laminations, does not require drying or seasoning, thereby reducing the possibility of introduction of dirt between the laminations. By the use of my improved mixture and method of application thereof, the resultant composite sheet possesses an exceptionally tenacious bond, the sheet is exceedingly stable, and clear to vision. Further, by the use of the present invention; the cost of manufacturing safety glass is comparatively low because of the relatively few operations required.

Other objects and advantages of the invention will become more apparent during the course of the following description when taken in connection with the accompanying drawing.

In the drawing wherein like numerals are employed to designate like parts throughout the same, Fig. 1 is a vertical longitudinal section through one form of machine that can be used in applying my improved mixture to the laminations.

Fig. 2 is a fragmentary sectional view of the laminations in proper superimposed relationship but shown spaced from one another for purposes of illustration, Fig. 3 is a fragmentary vertical longitudinal section through a form of device that can be used in pressing the laminations together, Fig. 4 is a diagrammatic representation of a platen press, Fig. 5 is a vertical transverse section through an autoclave, and Fig. 6 is a fragmentary sectional view of a finished sheet of safety glass.

Referring to Fig. 2, the numerals 11 and 12 designate two sheets of glass between which is arranged a plastic sheet 13 which may be any cellulose composition material, for example, pyroxylin plastic. As is shown in Fig. 2, each of the glass sheets has a coating 14 thereon. The present invention has particular reference to the coating 14.

It is an aim of the present invention to provide a bonding agent that will act not only as an adhesive between the laminations, but will also include a solvent or mixture of solvents adapted to act upon the layer 13.

Another important feature of the invention is to provide a bonding agent giving a process which will accommodate pyroxylin plastic sheet made throughout the different seasonal periods of the year and to produce a laminated product having a satisfactory bond regardless of the time of the year the pyroxylin plastic is manufactured and used. Broadly, the present mixture possesses a water soluble adhesive which will give a satisfactory bond when the stock has a considerable amount of moisture present during the summer months and at the same time the bonding agent includes a solvent that will give a so-called nitrocellulose bond which theoretically, at least, will predominate in the fall and winter months when the plastic, as received, is fairly free of moisture.

However, in the preferred embodiment of the invention, all of the pyroxylin plastic used is subjected to a treatment whereby to control, within reasonable limits, the moisture content of the plastic. Such treatment will tend to give substantially uniform results throughout the year.

To produce my improved bonding agent, a water soluble adhesive, for example, gelatin, is reacted in a pyroxylin plastic solvent, for example, diethylene glycol. To assist in the reaction, a salt such as calcium chloride, can be added to the mixture. In addition to calcium chloride, such salts as barium chloride, manganous, and cerium chloride may be employed. The role played by the salt during the reaction period is not definitely known, although it is believed the reaction is catalytic in nature rather than any definite chemical reaction in view of the exceedingly small quantities required to produce results. As little as $\frac{1}{16}$% of salt is ordinarily ample.

To produce the mixture, 4 parts of gelatin and 56 parts of diethylene glycol together with the $\frac{1}{16}$% of calcium chloride are mixed together and reacted at elevated temperatures for approximately four hours. It has been found that a temperature of 212° F. is sufficient to get the desired reaction.

After the mixture has been reacted for approximately four hours, 40 parts of diluent, such as distilled water, can be added.

While a mixture of gelatin and diethylene glycol can be made, preferably with the assistance of the salt, and employed as a bonding agent in the manufacture of commercial safety glass, nevertheless it is my opinion that the addition of a diluent such as distilled water is to be preferred because by including the diluent in the mixture, less skill is required in the assembling of the glass to get completely satisfactory results.

The same results are not obtained in making of a solution by simply mixing all of the ingredients of diethylene glycol 56 parts, water 40 parts, and gelatin 4 parts, plus 1/10% by weight calcium chloride and then heating. Such a mixture behaves entirely differently from a mixture produced by first reacting the water soluble adhesive, the solvent, and the salt, and then adding the water as above outlined.

Referring again to the drawing, in Fig. 1 is illustrated a type of machine that can be used in applying my improved mixture to the laminations. This is one of the advantages to be gained by the use of this mixture, namely, the ability to satisfactorily apply the same to the laminations by mechanical means in contra-distinction to application by spraying or otherwise. It is not to be inferred that I limit myself to the use of such a machine because the bonding material can be applied to the laminations in any preferred manner. The advantages of the coating machine illustrated, however, among other things, reside in the ability to control rather accurately the character of the deposit upon the laminations and the reduction to a minimum of the possibility of dirt introduction between the laminations.

In Fig. 1, the numeral 15 designates a receptacle adapted to contain my improved bonding mixture 16. The receptacle 15 has a discharge outlet 17, the effective opening of which is controlled by the adjusting mechanism 18. Mounted beneath the discharge outlet or spout of the hopper is a pair of rolls 19 and 20 positioned to create a pocket which receives the bonding mixture. Mounted in operative association with the roll 20 is a third roll 21 beneath which is placed the rotatable roll 22. The roll 22 is one of a series forming a conveyor adapted to support and move the glass sheet 23 between the rolls 21 and 22.

The rolls 19, 20 and 21 are illustrated in spaced relation for the purposes of illustration, and the bonding material is shown in a film 24. In actual practice, the rolls contact one another and the bonding agent completely covers the peripheries of all of the three rolls. It has been found that a combination of metal and rubber rolls will give very satisfactory results. The deposit 25 of material upon the glass sheet 23 is controlled by the relative positions of the rolls 19, 20 and 21 and also the relative position of the rolls 21 and 22.

After the glass sheet has passed through the coating machine, it is not necessary to dry or season the same, but it can be used immediately. Thus, in Fig. 2, the two coated sheets of glass have arranged therebetween the pyroxylin plastic layer 13. This assembly forms what is known in the art as a sandwich. At the time the sandwich is made, the bonding material 14 on the glass is "wet" and because of the ability to promptly assemble the coated glass, the possibility of dirt entering into the sandwich is further minimized.

After arranging the laminations in sandwch form, they may be pressed in any preferred manner to give a finished composite structure. In the drawing, a series of rolls are shown in Fig. 3 which serve as pre-pressing rolls. The sandwiches may be carried on the conveyor 26 between the series of pairs of rolls 27 formed from a compressible material such as rubber. The rolls 27 are positively driven and adjusted to give the necessary pressure to the sandwich to bring the inner surfaces thereof into intimate contact. In so doing, noncondensable gases are excluded from between the laminations. Temperature controlling devices 28 can be arranged in the chamber 29, although this is not necessary in all cases.

After the treatment in the apparatus of Fig. 3, the sandwich may be further pressed in the platen press 30. From the press 30, the glass may go to the autoclave 31.

The autoclave consists of a casing 32 in which may be arranged the heat exchanger system 33 and an agitating device 34. The sandwiches can be placed in a rack 35 movable into and out of the autoclave upon removal of the top 36. In operation, the glass is placed in the autoclave which is closed, and a fluid under pressure can be circulated through the conduits 37, and by reason of the heat exchanger system, the temperature thereof can be controlled. While in the autoclave, the glass can be subjected to a pressure of about 200 pounds per square inch for a period of twelve to fifteen minutes and at a temperature of substantially 250° F.

Upon the removal of the glass from the autoclave, the marginal portions may be undercut and a weather-resisting seal 38 applied. This is shown diagrammatically in Fig. 6. While the coatings 39 are shown in Fig. 6, in actual practice the bonding material is not discernible in the finished product.

As hereinabove pointed out, I depend not only on the adhesive characteristics of the water soluble adhesive for bonding action, but also employ the solvent action of the solvent part of the mixture on the pyroxylin plastic to assist in giving a satisfactory bond between the laminations. The adhesive part of the mixture adheres very closely to the glass sheets, while the solvent constituent attacks the pyroxylin plastic particularly upon the elevation of temperature during the pressing cycle in a manner to bring about a very close union between the various laminations.

While the process has been described by setting forth that the coating is applied to the surface of the glass, it will of course be appreciated that this coating can be applied to the surfaces of the non-brittle material as well as to the surfaces of the glass, or both.

With further reference to the bonding material, it may be well to point out that while the 40 parts of water appears to be quite substantial, the question of amounts is pertinent, and because of the very thin film that is applied to the glass, the small amount of water added as a diluent is readily absorbed during the laminating cycle so that the solvent responsible for the nitro-cellulose adhesion plays an important part in the resulting bond.

As above pointed out, I prefer that the pyroxylin plastic used be treated prior to lamination in a humidified atmosphere whereby to accurately control, within certain limits, the water content of the pyroxylin plastic. The amount of water added in the bonding agent is of course taken into consideration, but this is rather negligible insofar as the total amount of moisture contained in the laminated sheet is concerned. On the other hand, the addition of the water is employed as a diluent.

In commercial practice, after the glass sheets have been coated, the pyroxylin plastic is assembled between the glass sheets and oftentimes the operators will not get the pyroxylin plastic properly positioned the first time so that it is necessary to shift the plastic with respect to the glass. Where an undiluted mixture is used, there is at times a tendency for the plastic to stick to the glass, causing difficulty in moving thereof with respect to the glass. By adding the diluent, this condition is not as noticeable and therefore the operators can more readily line up the laminations for proper position.

In addition to the use of diethylene glycol, other polyglycols may be used, and I have in mind particularly polyglycols having higher molecular weights as for example, tri, tetra, and penta ethylene glycols. It may be that with the use of such polyglycols, the amount of diluent added can be either reduced or entirely eliminated.

As above pointed out, the water diluent should not be added to the mixture until after the gelatin and diethylene glycol have been reacted in the manner described.

While 40 parts of water have given very satisfactory results, the amount of diluent is of course dependent upon the particular solvent used in the mixture, the amount of solvent, the temperature at which it is applied and the particular degree of solvent action desired. Therefore, a greater or lesser amount of water or other diluent can be used as desired.

It is to be understood that the form of the invention herewith described is to be taken as the preferred embodiment of the same and that various changes in the ingredients and proportions may be resorted to without departing from the spirit of the invention or the scope of the subjoined claims.

I claim:

1. The process of producing safety glass, consisting in reacting a mixture of gelatin and a polyglycol, then adding water thereto, and depositing such solution on one surface each of two sheets of glass, interposing a translucent plastic layer between the coated surfaces of the two glass sheets, and then subjecting the sandwich thus formed to the combined action of heat and pressure to produce a composite structure.

2. The process of producing safety glass, consisting in reacting a mixture of gelatin, diethylene glycol, and a salt, then adding water thereto, and depositing such solution on one surface each of two sheets of glass, interposing a translucent plastic layer between the coated surfaces of the two glass sheets, and then subjecting the sandwich glass sheets, and then subjecting the sandwich thus formed to the combined action of heat and pressure to produce a composite structure.

3. The process of producing safety glass, consisting in reacting a mixture of gelatin, diethylene glycol, and calcium chloride, then adding water thereto, and depositing such solution on one surface each of two sheets of glass, interposing a translucent plastic layer between the coated surfaces of the two glass sheets, and then subjecting the sandwich thus formed to the combined action of heat and pressure to produce a composite structure.

4. The process of producing safety glass, consisting in reacting a mixture of gelatin and diethylene glycol in a ratio of 4 to 56, then adding 40 parts of water, and depositing such solution on one surface each of two sheets of glass, interposing a translucent plastic layer between the coated surfaces of the two glass sheets, and then subjecting the sandwich thus formed to the combined action of heat and pressure to produce a composite structure.

5. The process of producing safety glass, consisting in reacting a mixture of gelatin and diethylene glycol in the ratio of 4 to 56 in the presence of a small amount of salt at elevated temperatures, then adding 40 parts of water, and depositing such solution on one surface each of two sheets of glass, interposing a translucent plastic layer between the coated surfaces of the two glass sheets, and then subjecting the sandwich thus formed to the combined action of heat and pressure to produce a composite structure.

6. As a new article of manufacture, a sheet of safety glass, consisting of two sheets of glass and an interposed translucent plastic membrane bonded together by the aid of a mixture of gelatin and diethylene glycol reacted together and to which water is added as a diluent after said reaction has taken place.

7. As a new article of manufacture, a sheet of safety glass consisting of two sheets of glass and an interposed pyroxylin plastic layer bonded together by the aid of a mixture of gelatin, diethylene glycol, a salt, and a diluent.

8. As a new article of manufacture, a sheet of safety glass consisting of two sheets of glass and an interposed pyroxylin plastic layer bonded together by the aid of a mixture of gelatin, diethylene glycol, a salt, and water.

9. As a new article of manufacture, a sheet of safety glass consisting of two sheets of glass and an interposed pyroxylin plastic layer bonded together by the aid of a mixture of gelatin, diethylene glycol, and water in the approximate ratio of 4 to 56 to 40.

GEORGE B. WATKINS.